United States Patent

Valyi

[11] 3,966,378
[45] June 29, 1976

[54] APPARATUS FOR MAKING ORIENTED HOLLOW PLASTIC ARTICLES

[76] Inventor: Emery I. Valyi, 5200 Sycamore Ave., New York, N.Y. 10471

[22] Filed: May 28, 1974

[21] Appl. No.: 473,580

[52] U.S. Cl. ............................. 425/242 B; 264/94; 425/324 B; 425/387 B; 425/DIG. 209; 425/DIG. 215; 425/DIG. 228

[51] Int. Cl.$^2$ ..................... B29C 1/00; B29C 17/00

[58] Field of Search .. 425/404, 445, 446, DIG. 208, 425/DIG. 209, DIG. 211, DIG. 213, 387 B, 242 B, 324 B, DIG. 215; 264/94, 96, 97

[56] References Cited
UNITED STATES PATENTS

3,189,422  6/1965  Shea et al. ................. 425/DIG. 214
3,776,991  12/1973  Marcus ..................... 425/DIG. 211

*Primary Examiner*—Francis S. Husar
*Assistant Examiner*—Robert J. Charvat
*Attorney, Agent, or Firm*—Robert H. Bachman

[57] ABSTRACT

Method and apparatus for the preparation of oriented hollow objects of moldable organic plastic material by providing a parison on a first blow core, expanding said parison into an intermediate shape, as by pre-expanding it, transferring said pre-expanded parison to a second blow core, finally extending and expanding said parison to form said hollow object in finished shape.

41 Claims, 13 Drawing Figures

APPARATUS FOR MAKING ORIENTED HOLLOW PLASTIC ARTICLES

BACKGROUND OF THE INVENTION

This invention relates to the art of blow molding articles of organic plastic material from a parison and has for its principal object the provision of improved, oriented hollow articles and a method and apparatus for obtaining same.

The art teaches various methods and apparatus for obtaining blow molded articles of organic plastic material from a parison, such as in U.S. Pat. Nos. 3,349,155 and Re. 27,104. Generally, these methods are characterized by forming a parison in a parison mold on a blow core, placing said formed parison and blow core into a blow mold and expanding said parison in the blow mold by means of fluid pressure.

Naturally, the blowing procedure inherently produces orientation in the plastic due to expansion in a radial direction; however, it is highly desirable to produce orientation in the axial direction as well. Heretofore, this has been done by reheating the parison and, before blowing, axially orienting the parison, such as by stretching.

Such known methods are subject to disadvantageous aspects. A particular disadvantage has been the difficulty of maintaining uniform wall thickness. Obviously, control of wall thickness distribution is quite important. Other difficulties include insufficient control of the parison dimensions and degree of orientation and time consuming and inconvenient operations.

SUMMARY OF THE INVENTION

In accordance with the present invention, a method is provided for the preparation of hollow articles oriented in the axial, radial and tangential directions from moldable organic plastic materials which comprises providing a parison on a first blow core, partially expanding said parison so as to free it from surface contact with said blow core and to convert it to a shape intermediate between that of the parison and that of the finished article, transferring said parison to a second blow core, axially extending and finally expanding said pre-expanded parison to form said hollow object.

If it is desired to produce a multi-layered parison, the blow core may first be provided with a layer of one plastic, and a subsequent layer may then be pressure molded therearound, in accordance with my U.S. Pat. Nos. 3,349,155, 3,717,544 and 3,719,735. While the general description that follows refers simply to parisons, it is understood that the method and apparatus of the present invention are applicable to multi-layered as well as single-layered parisons. In this regard, further description is provided below for various such modifications within the scope of this invention.

The apparatus of the present invention includes a first blow core, means for providing a parison thereon, a pre-forming mold for partially expanding and, if desired, partially extending said parison on said first core in an axial direction, means for so expanding and extending said parison on said first core, means for separating said first core from said pre-forming mold and the pre-formed parison contained therein, a second blow core in spaced relationship to said first core, means for transferring said pre-formed parison to said second core, means for axially extending said pre-formed parison, a second mold in spaced relationship to said pre-forming mold, and means for fully expanding the partially expanded and axially extended parison in said second mold.

It can be readily seen that the hollow article of the present invention is characterized by highly improved properties by virtue of the fact that the walls thereof are controllably oriented in the axial, radial and tangential directions. It is known that orientation substantially improves the significant properties of plastics, as clarity, impact resistance, strength, resistance to permeation, etc. Among the plastics that can be so improved are polystyrene, polyvinyl chloride, polyolefins, as polyethylene and polypropylene, polyesters, polyamides, acrylics, acrylonitrile and methacrylonitrile polymers. The controlled orientation in the axial, radial and tangential directions, which characterizes the article of the present invention, therefore represents a significant advantage, and an advantage which is obtained in a simple and expeditious manner.

Accordingly, it is a principal object of the present invention to provide a method for the preparation of hollow articles from moldable organic plastic material which are characterized by being controllably oriented in the axial, radial and tangential directions.

It is a further object of the present invention to provide a method as aforesaid which yields products possessing uniform wall thickness.

It is yet a further object of the present invention to provide an apparatus for use in the method as aforesaid which enables the several steps to be conducted continuously and concurrently.

Other objects and advantages will be apparent to those skilled in the art from the description which follows with reference to the accompanying drawings.

DETAILED DESCRIPTION OF THE PREFERRED EMBODIMENTS

Figure 1:
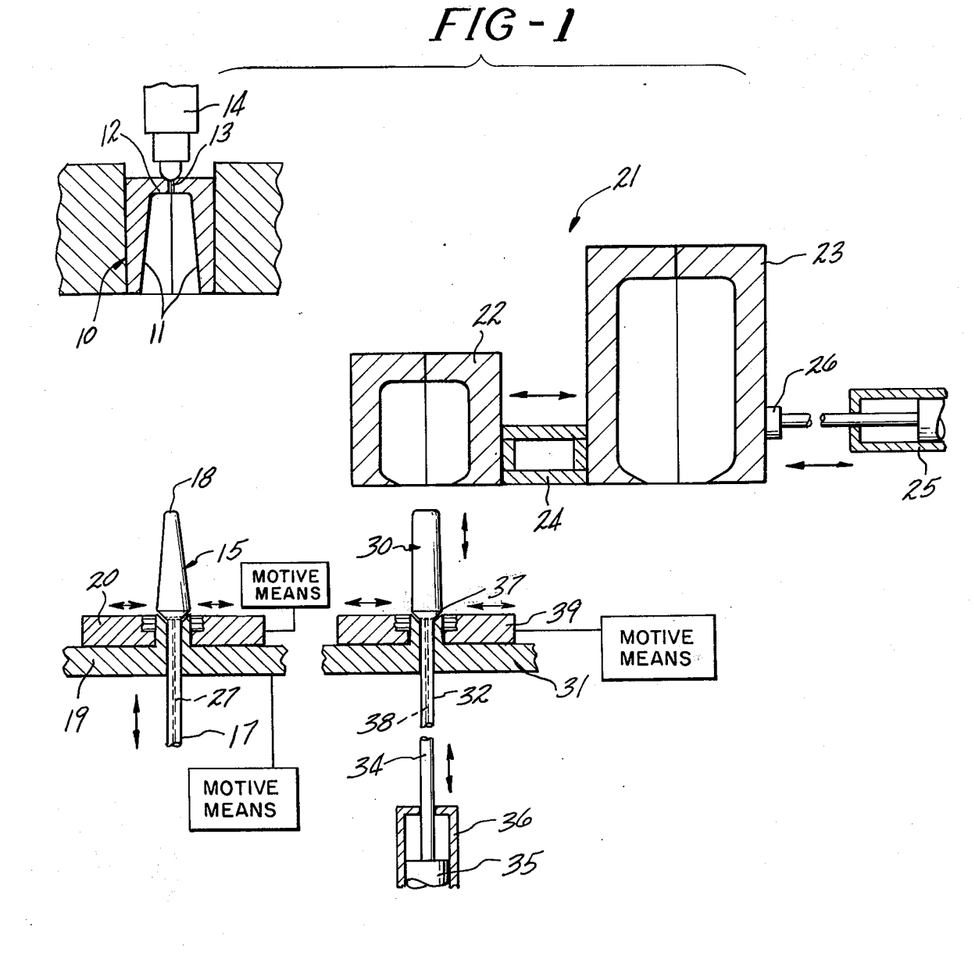
FIG. 1 is an elevation, partly in section illustrating an apparatus in accordance with this invention.
Figure 2A:
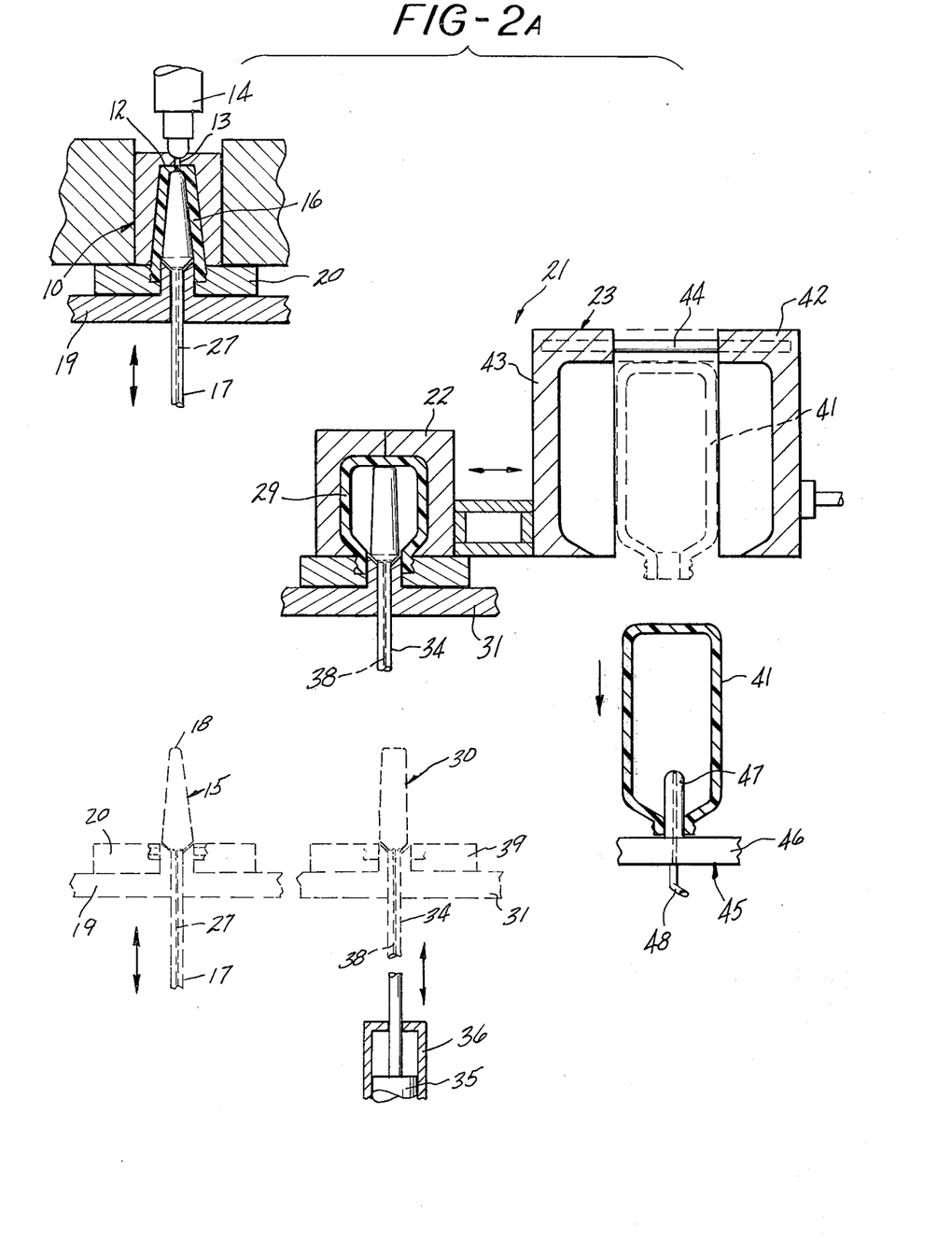
FIG. 2A and 2B are views similar to FIG. 1 with additional portions in phantom showing a sequence of operations according to an embodiment of the method of this invention.
Figure 2B:
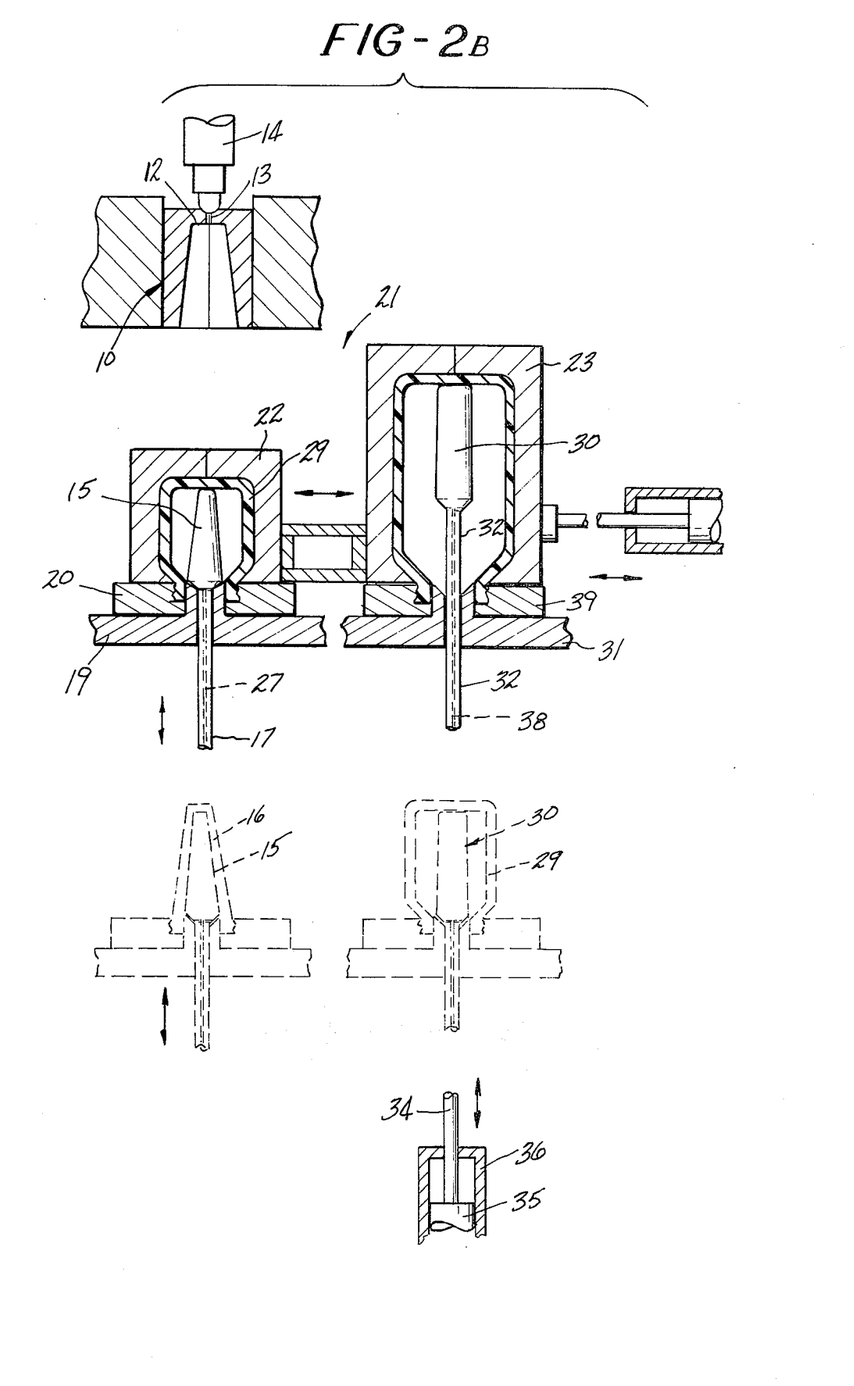

Referring to the drawings in more detail, FIGS. 1, 2A and 2B illustrate an apparatus in accordance with one embodiment of the present invention. In this embodiment, the parison is provided by an injection molding process, however, the invention is not limited thereto and includes other known molding processes that are capable of producing parisons such as compression molding, casting, extrusion with or without secondary operation, and the like. FIG. 1 depicts a parison die 10, having outer walls 11 which may be separable, depending upon the shape of the parison and which are adapted to form the outer surface of the parison, and having an end wall 12 shaped to form the end wall of the parison. The end wall 12 of the parison die has an injection opening 13 registering with an injection nozzle 14 through which the organic plastic material is injected into the parison die. The parison die 10 is shown as split for convenience in opening to release the formed parison, however, it should be understood that the invention is not limited thereto, as one-piece dies having suitable release mechanisms known in the art are encompassed herein.

As indicated hereinabove, the plastics contemplated in accordance with the present invention are the moldable organic plastic materials whose properties are improved by orientation, such as the polyolefins, polyethylene, polypropylene and copolymers thereof, polyvinyl chloride, polystyrene, acrylonitrile, methacrylonitrile, polyvinylidene chloride, polycarbonates, polyesters, polyamides, etc.

The formation of the parison in accordance with the embodiment illustrated in FIGS. 1, 2A and 2B takes place after a first blow core 15 illustrated in FIG. 1, and set forth in phantom in FIG. 2A, and die 10 are brought into engagement in the manner shown diagrammatically in FIG. 1. Upon completion of injection through nozzle 14, a parison 16 having substantially the configuration represented in FIG. 2A, is formed.

Blow core 15 encompasses an axially extensible portion 17 and provides a side wall and an end 18 for the formation with walls 11 and 12 of parison die 10, of a die cavity in which the parison is formed. Blow core 15 is carried by platen 19. This assembly further includes neck mold 20 which engages the parison while the latter is on blow core 15 after disengagement from parison die 10. Neck mold 20 may be split and opened into two portions by suitable mechanical means, in the manner shown diagrammatically in FIG. 1, to release the parison, or, if the configuration of the neck permits, may be of one-piece construction and, thus, removable from the parison as a unit. In the embodiment illustrated in FIGS. 1, 2A and 2B, neck mold 20 possesses threads which define a threaded opening in the final molded object.

Upon separation of the parison die 10 and the blow core 15 bearing parison 16, the latter assumes the position depicted in FIG. 1 and shown in phantom in FIG. 2B. Mold assembly 21 which comprises a pre-forming mold or pre-blow mold 22 and a second blow mold or finish mold 23, and blow core 15 are brought into alignment so as to juxtapose pre-blow mold 22 and parison 16, illustrated, as noted earlier, in phantom in FIG. 2B. Pre-blow mold 22 and finish mold 23 are maintained in integral spaced relationship by connecting member 24, and are arranged for reciprocation, for example, by means of hydraulic cylinder 25 which is illustrated in FIG. 1 as connected to finish mold 23 by the attachment labeled 26 thereon. The assembly may be supported for traverse between the position suggested in FIGS. 2A and 2B, respectively, by conventional means, such as tie bars or rails, not shown herein. Assembly 21, as described above, is merely illustrative of one embodiment of this invention and is capable of modifications in design and operation, as will be illustrated further on.

Referring now to FIG. 2B, upon the alignment of pre-blow mold 22 and core 15 bearing parison 16, as noted earlier, blow core 15 and parison 16 are then placed within pre-blow mold 22, for example, in the manner indicated in the figure. Other means of engaging parisons and blow molds may be used and are well known, such as those disclosed in U.S. Pat. Nos. 2,853,736 and 2,974,362. The parison is then partially expanded into pre-blow mold 22, whose temperature may be controlled by conventional means, not shown, to optimize the parison temperature for subsequent operations. Also, the parison is thereby freed from blow core 15. As is illustrated in the figures, expansion is conventionally achieved by the provision of fluid under pressure through passages 27 provided within blow core 15 for that purpose. Axial extension of the parison may also be effected, if desired, after it is freed from the blow core, as above, by means of extensible portion 17 of blow core 15. The purpose of this step is to adjust the temperature of the parison for optimum conditions during orientation and to avoid difficulties heretofore encountered during axially extending the parison while in surface contact with the blow core. For example, if the parison is axially extended while in surface contact with the blow core it tends to thin out unacceptably in localized regions due to the constraint caused by friction against the walls of the blow core. FIG. 2B illustrates the extent of expansion, as the perimeter of the expanded parison 16 is represented in phantom and the pre-expanded parison resulting from the exertion of fluid pressure is labeled 29. While axial extension is not shown at this stage, it is noted that such extension may be effected by means of extensible portion 17 of blow core 15.

After completion of the partial expansion, or pre-expansion of the parison, pre-blow mold 22 and blow core 15 are separated, and pre-expanded parison 29 is retained by pre-blow mold 22. As noted earlier, disengagement of parison 29 from blow core 15 may require either the opening or other removal of neck mold 20. Blow core 15 is then returned to the starting position as illustrated in FIG. 1, and mold assembly 21 including pre-blow mold 22 containing pre-expanded parison 29 is shifted laterally into the position illustrated in FIGS. 1 and 2A.

Parison 29 which is retained within pre-mold 22, is transferred to a second blow core 30 for the final forming sequence. Blow core 30 is situated in the same spaced relationship to blow core 15 as exists between pre-mold 22 and finish mold 23, to enable both cores to engage a respective mold when core 15 is aligned with mold 22. This facilitates the concurrent pursuit of both the pre-forming and final forming processes with separate parisons. Further, and with regard to the transfer of pre-expanded parison 29 to core 30, it should be noted that parison die 10 is spaced from pre-mold 22, as illustrated in FIGS. 1 and 2A, so that core 15 may engage with die 10 to form another parison while core 30 engages with pre-mold 22. The ability to concurrently conduct the various operations of the process outlined herein comprises one of the notable advantages of the invention. The simultaneous formation, pre-expansion, or final expansion and finished article removal of a plurality of parts is envisioned, as the apparatus illustrated in the accompanying figures can be further modified to provide additional intermediate molds and cores, such as mold 22 and core 30. If a large volume operation is desired, then a multiplicity of mold cavities and cores will be employed at each operating station, as is customary in the art.

As stated above, parison 29 is transferred to blow core 30 for further processing. Core 30 includes a transfer, stretch and blow assembly which is carried by platen 31 and which comprises a mandrel extension 32 which is reciprocable together with core 30 as indicated by the arrow in FIG. 1 to axially extend the pre-expanded parison 29. An actuating means is shown which comprises a push rod 34 which engages mandrel 32, and which is connected to a piston 35 housed within a cylinder 36 which may, for example, be responsive to hydraulic pressure exerted by a pump, not shown. Such actuating means is merely illustrative of one manner of operation, as other actuating means known in the art can be employed herein.

A fluid passageway 38 is provided and extends radially, usually at the end surface of the core 30 that is attached to mandrel 32, in the manner known in the art for the construction of blow cores. Fluid passageway 38 also connects to a source of fluid under pessure not shown. Accordingly, fluid may enter the space inside pre-expanded parison 29 during final expansion, discussed hereinafter.

A neck mold 39 is provided which is carried by platen 31 and cooperates with sleeve portion 37 of the core to define the neck of the parison. Neck mold 39 is in all respects identical to neck mold 20, and may likewise be modified in the manner suggested earlier for the latter. In fact, the assemblies comprising cores 15 and 30 are usually identical, except for obvious dimensional differences.

Referring to FIG. 2A, the transfer of parison 29 is conducted by the axial extension of blow core 30 into engagement with pre-blow mold 22. To facilitate the removal of the parison, neck mold 39 is brought into engagement with the exposed neck portion of the parison. For example, if a split neck mold is employed, it should be held open to permit entry of the parison, and thereafter closed as shown diagrammatically in FIG. 1 in the same manner as neck mold 20. Blow core 30 is then retracted from pre-blow mold 22, which may be split to release preformed parison 29. Upon release, core 30 with parison 29 thereon engaged by neck mold 39, returns to the position illustrated in FIG. 1 and depicted in phantom in FIG. 2B.

Upon completion of the above transfer, mold assembly 21 is laterally shifted so as to juxtapose finish mold 23 and blow core 30 while at the same time aligning pre-blow mold 22 and core 15, as described earlier and depicted in FIG. 2B. The blow cores are then received within the respective molds, and parison 29 is axially extended into contact with the inner surface of finish mold 23, as represented in phantom, by the advancement of mandrel 32 by means of push rod 34. The same effect can be achieved, even in pre-blow mold 22, by the use of a blow core which employs a segmented mandrel having an axially extensible anterior portion such as is disclosed in my copending U.S. Pat. application Ser. No. 338,362, filed Mar. 5, 1973. This step conveniently stretches the parison longitudinally before final blowing, without the problems noted heretofore, and thereby produces orientation in the axial direction as well as the orientation subsequently produced by blowing. It can be seen that frictional discontinuities are avoided and that the temperature of the parison, in its original and pre-blown states may be properly controlled by contact with the respective molds.

After the completion of axial extension, the parison is fully expanded to conform to the configuration of finish mold 23 to form the final object 41 which, in the embodiment illustrated herein, is a bottle. Full expansion is accomplished by supplying fluid under pressure through passageway 38 into the interior of axially extended parison 29.

After full expansion is completed, blow core 30 and finish mold 23 containing final object 41 are separated in the same fashion described earlier with reference to blow core 15 and pre-blow mold 22, and blow core 30 is positioned as shown in phantom, in FIG. 2A. Referring further to FIG. 2A, mold assembly 21 is shifted laterally, and finish mold 23 is positioned for removal of final object 41, which is by then cooled sufficiently for that purpose.

Removal is conducted in various ways depending upon the configuration of the finish mold. In the embodiment illustrated herein, finish mold 23 possesses a constricted opening, and is longitudinally split into two sections labeled 42 and 43, which may reciprocate in and out of communication along connecting means 44, by an actuating means, not shown, such as, for example, a hydraulic cylinder. Thus, in FIG. 2A, sections 42 and 43 are parted an amount sufficient to permit the escape of object 41 as illustrated in phantom, and object 41 is then easily removed and may, for example, be placed on a carrier assembly 45, comprising a platform 46 which supports an appropriately dimensioned transfer finger 47 connected to a source of fluid by line 48, which is placed into the opening located in the neck of object 41, such as that which is disclosed in my U.S. Pat. No. 3,587,133.

Figure 8:
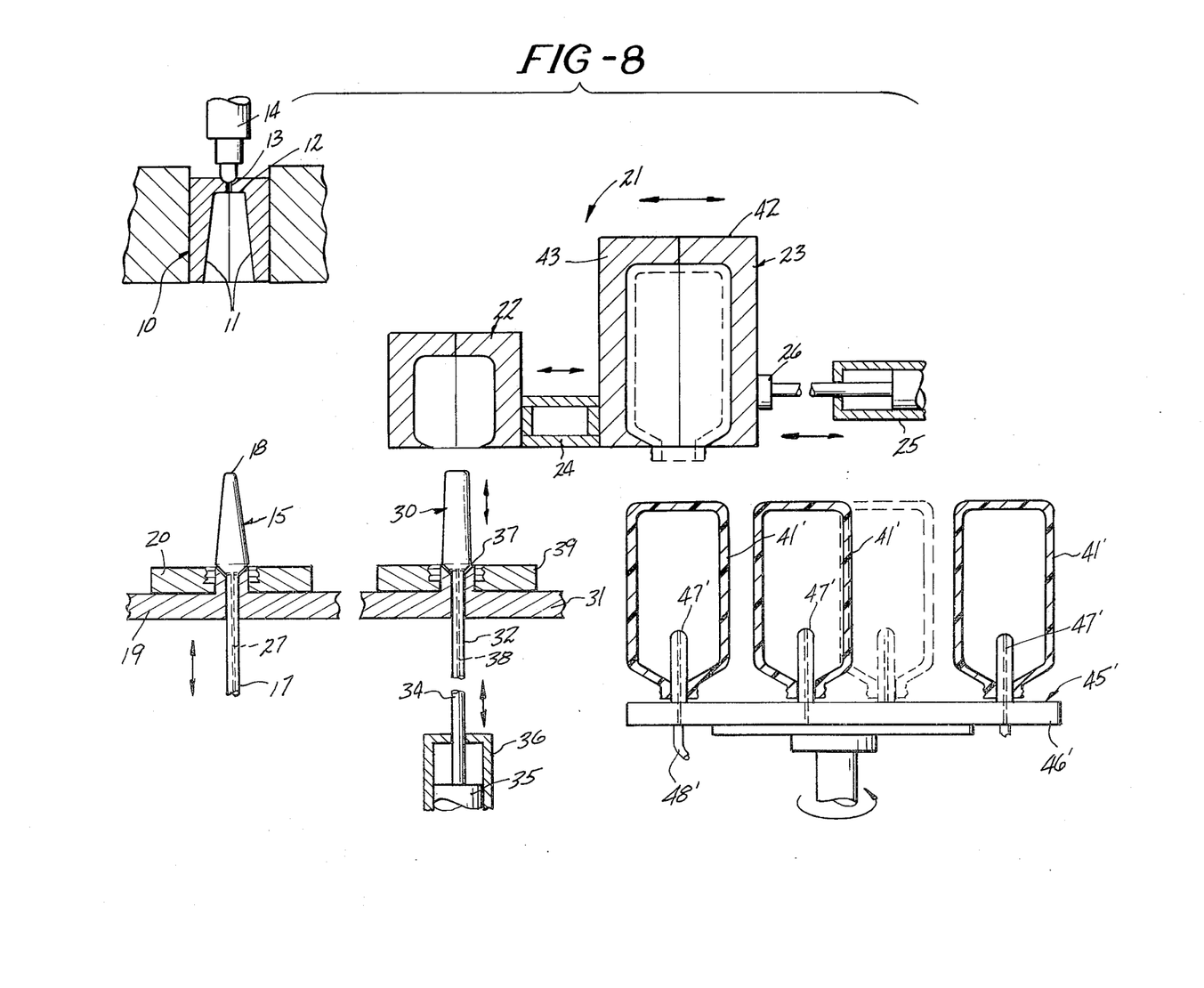
FIG. 8 shows rotary indexing removal fingers employed in accordance with this invention.

In a further embodiment disclosed in the aforementioned U.S. Patent and depicted in FIG. 8, carrier assembly 45' comprises a rotary platform 46' which carries a plurality of transfer fingers 47' which are arranged to index from position to a position of final removal of objects 41'. This arrangement is particularly useful with objects which, though removable from the finish mold, are insufficiently cooled to be handleable.

Figure 9:
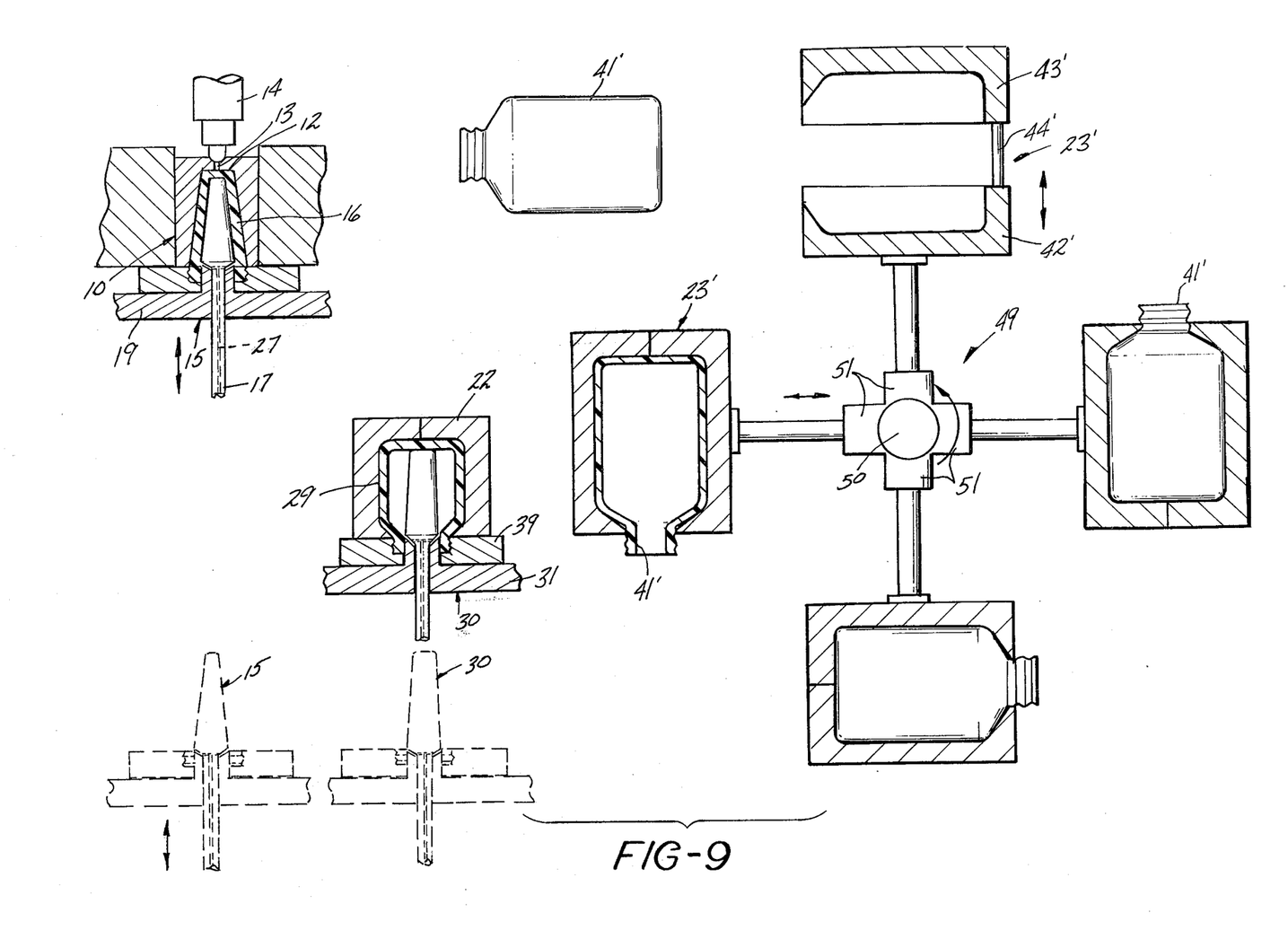
FIG. 9 is a sectional view showing rotary indexing finishing molds in accordance with an alternate embodiment of this invention.

Yet a further modification of the removal step is contemplated, wherein a plurality of finish molds is employed which, though capable of lateral reciprocation in the same manner as finish mold 23 in FIG. 1, are separable from pre-blow molds and are carried by an indexing device to provide a longer residence time of the final object in the mold. The indexing device may be any device which is capable of conveying the finish molds in and out of position in the mold assembly. One such device is illustrated in FIG. 9, wherein a rotary indexing carousel 49 is shown carrying four finish molds 23' on extensible connecting arms 51 which radiate from a hub member 50. Connecting arms 51 are reciprocable to provide the lateral movement for the finish molds, and may be proximally enlarged as illustrated to house a reciprocating means, such as, for example, a hydraulic cylinder. Naturally, other means of reciprocation which are known in the art would be suitable herein, and the invention is not limited to hydraulic power.

In operation, carousel 49 indexes a mold 23' into position adjacent pre-blow mold 22. Mold 23' is coupled thereto by a coupling means, not shown, and extensible connecting arm 51 permits it to reciprocate in conjunction therewith. Mold 23' is thus brought together with core 30. Upon finally expanding the parison and disengaging from core 30, mold 23' bearing object 41' is then indexed out of alignment with core 30 and moved in a counter-clockwise direction, in accordance with the figure, and the next empty mold takes its place. The mold travels to the position it assumes just before being re-coupled with pre-blow mold 22, at which point, object 41' is removed.

Removal is conducted in the same manner as with finish mold 23, as the molds of this embodiment are likewise separable into sections 42' and 43', respectively, which are reciprocable in and out of contact upon alignment means 44. Actuating means, not shown, for the opening and closing of mold 23' may comprise suitably placed cams, or hydraulic cylinders, as is customary for this type of device.

It is considered that the above embodiment could be employed in conjunction with the embodiment of FIG. 8 to provide, where desirable, an extended cooling time for the final object. Other devices which are known to those skilled in the art may be employed in place of the aforenoted carrier assembly within the scope of this invention.

Though a method and apparatus have been described above with reference to the preparation of single-layered parisons by injection or other pressure molding in a parison die, and exposing said parisons immediately to the further steps of the process, a wide variety of modifications may be employed within the scope of this invention.

Figure 3:
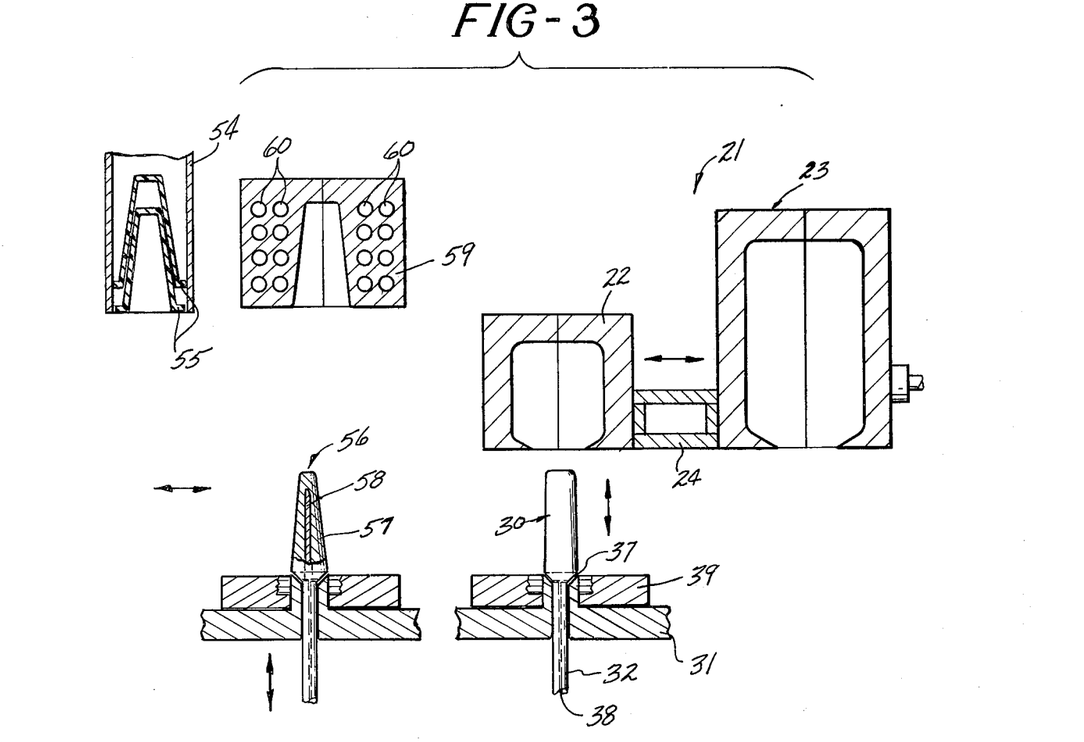
FIG. 3 is an elevated view, partly in section illustrating an alternate apparatus for providing a parison according to the method of this invention.

In one modification, the parison may be formed earlier at a time and location of its own, and stored before being formed into the final object. In addition to injection molding, numerous methods are known that may be employed to provide thermoplastics in the shape of a parison, such as tube extrusion with welding of one open end, dipping, deposition, thermoforming and the like. Thus, the previously produced parison may be transported to and placed upon a first blow core which cooperates with a heating means to raise the temperature of the parison sufficiently to enable it to undergo deformation. An apparatus of this type is shown in FIG. 3, wherein dispenser 54 contains a quantity of previously formed parisons 55 which are singly released upon engagement with core member 56. Core member 56 substantially resembles blow core 15 in FIG. 1, with the feature that mandrel 57 contains heating means 58 which may be an electric cartridge heater or a passage containing heating fluid maintained at an elevated temperature by external heating means, not shown.

In addition to heated core member 56, a heating mold 59 may be employed to heat the outer surface of the parison when in engagement therewith. Mold 59 is located in the same horizontal plane occupied by dispenser 54 and in spaced relation thereto, and, incidentally, retains the same position occupied by parison die 10 in FIG. 1. Core member 56 is adapted to reciprocate laterally as well as axially, so as to alternately align with both structures. Heating mold 59, like core member 56, may possess electric or fluid heaters 60 suitably placed to heat its inner walls for transmitting heat to a parison placed into contact therewith. Conventional temperature regulators are used to control the heating means of core 57 and mold 59 individually. Core member 56 and heating mold 59 may be held together under enough pressure with a parison between them to assure that the parison is uniformly brought to temperature for subsequent deformation.

Figure 4:
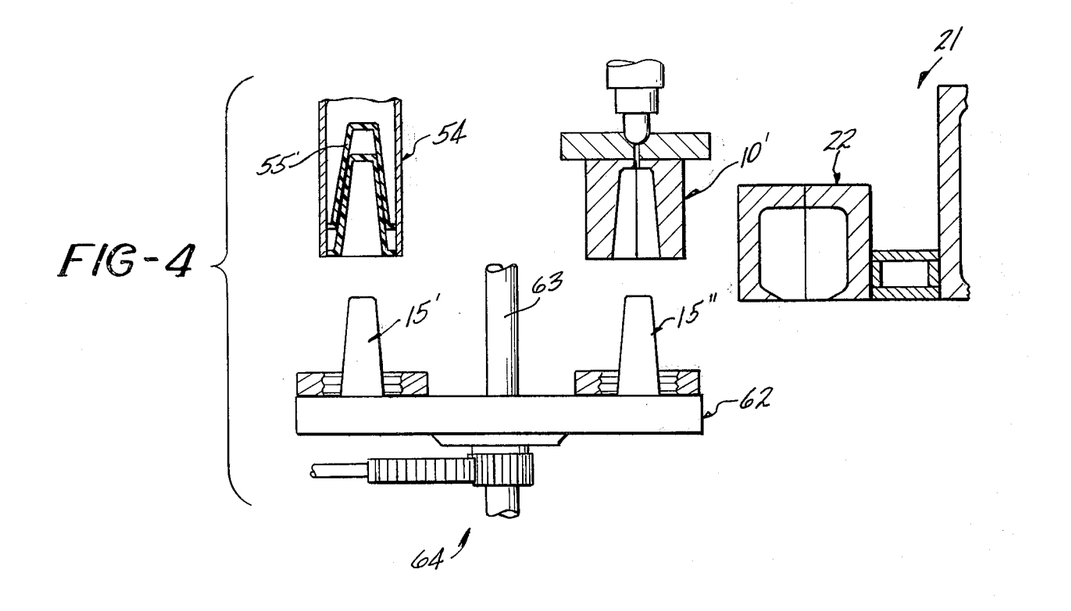
FIG. 4 is a view similar to FIG. 1 which shows an apparatus for the preparation of lined and composite parisons.

As noted earlier, the method and apparatus of this invention are easily adapted for the preparation of composite and lined hollow objects as, for example, described in my U.S. Pat. No. 3,737,259. In the embodiment shown in FIG. 4, dispenser 54 is shown in horizontal alignment with a parison die 10', and both are in vertical alignment with platform 62 carrying diametrically opposed blow cores 15' and 15", respectively, in all respects structurally conforming with first blow core 15 in FIG. 1. Platform 62 is adapted to reciprocate cores 15' and 15" into and out of engagement with dispenser 54 and die 10', on vertical rod 63, and is rotatably reciprocable by an actuating means, not shown, which cooperates with rack-and-pinion linkage 64. Thus, in operation, platform 62 is raised to simultaneously engage dispenser 54 and die 10', and core 15' receives a pre-form 55' which may be either a parison or a liner. Platform 62 is then lowered and, after transfer of the hot parison to pre-blow mold 22, it is rotated 180°. Core 15' carrying a preform 55' is thus brought into engagement with die 10'. If preform 55' is a liner, injection therearound of a subsequent layer takes place next. If pre-form 55' is a parison, die 10' serves merely to heat same to forming temperature, as above. As shown in FIG. 4, platform 62 and die 10' are spatially disposed to facilitate transfer of the composite or lined parison from core 15' to mold 22 in accordance with the embodiment illustrated in FIGS. 2A and 2B. The details of this apparatus are disclosed in my U.S. Pat. No. 3,737,259, issued June 5, 1973, and are incorporated herein by reference.

It is understood that, whenever previously produced parisons are employed, as for example in the embodiment according to FIG. 3, such parisons may be provided with an inside coating or liner, and, as such, may be multi-layered.

Figures 5A, 5B:
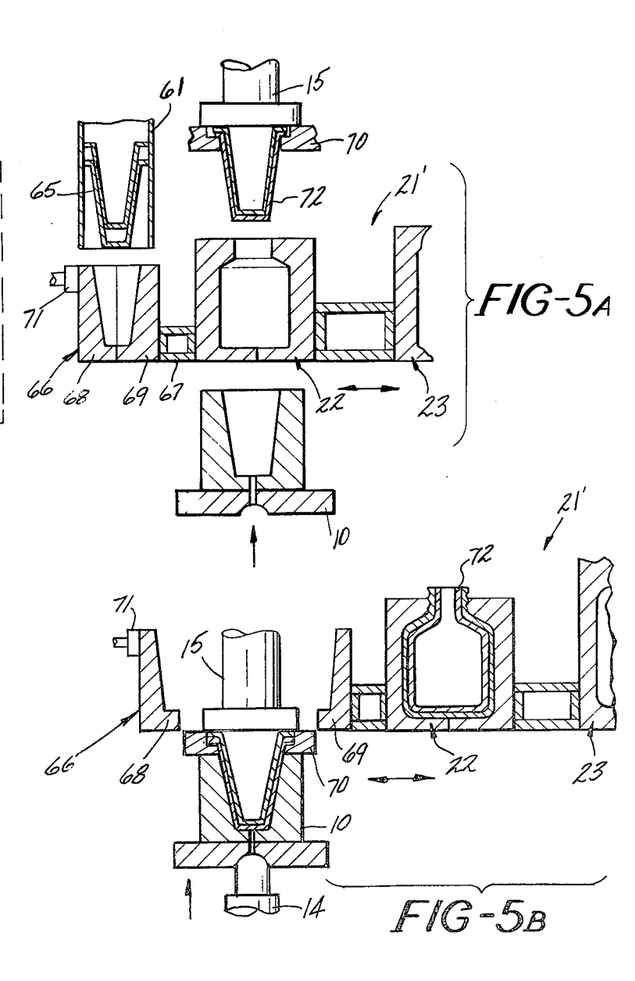
FIGS. 5A and 5B show an apparatus and sequence of steps illustrating an alternate preparation of lined and composite parisons.

An alternate embodiment for the preparation of composite or lined objects is shown in FIGS. 5A and 5B. In this embodiment, the apparatus is operative in the inverse direction from that of FIGS. 1–2B. The apparatus comprises a liner or parison dispenser 61 which is adapted to periodically release a parison or liner 65 into carrier assembly 66. Carrier assembly 66, which comprises a receptacle, is connected to pre-blow mold 22 by connecting member 67 in the same manner that member 24 connects molds 22 and 23. The entire assembly 21' is laterally reciprocable and, upon the placement of a liner or parison in carrier assembly 66, is moved so as to align carrier assembly 66 with blow core 15. Blow core 15 and parison die 10 are related here in the same manner disclosed in FIGS. 1–2B, except that, whenever a previously made parison is used, die 10 is a heating die as shown in FIG. 3, and, of course, is not in engagement with an injection nozzle. At the injection or heating step, as the case may be, shown in FIG. 5B, blow core, carrier assembly and die are in alignment.

In order to inject or heat the parison, blow core 15 is brought into engagement with carrier assembly 66 to receive parison or liner 65. The parison or liner 65 may also be engaged by a neck mold 70 in the manner disclosed with reference to neck mold 39, above. Upon receiving the parison or liner 65, core 15 continues its movement to engage die 10 to be heated, or surrounded by another, injected plastic, as the case may be. Carrier assembly 66 is divided into sections 68 and 69 which are adapted to part in response to an actuating means, not shown, which is connected to section 68 at 71. Thus, as shown in FIG. 5B, carrier assembly 66 parts to allow core 15 with the parison or liner thereon, to extend into die 10. By suitable linking of the movements of core 15 and sections 68 and 69, the core may thus be moved without pausing to await separation of sections 68 and 69.

After injection or heating is completed, core 15 and die 10 are separated and core 15 returns to the position depicted in FIG. 5A. Sections 68 and 69 of carrier assembly 66 are reunited and assembly 21' is laterally reciprocated whereby carrier assembly 66 and dispenser 61 are juxtaposed while pre-blow mold 22 is readied to receive core 15 bearing composite parison 72. Upon placement of composite 72 in mold 22, the cycle is carried forward as, for example, described in connection with FIGS. 1, 2A and 2B.

In addition to modifications such as the above, relating to the type of parison provided and the manner of its provision, there is contemplated a further modification dealing with the control of the parison during extension and blowing. Specifically, the embodiment illustrated in FIGS. 6 and 7A-7C comprises a series of individually temperature controlled molds coacting with a series of mandrels whose axial movement is individually and independently regulated.

Figure 6:
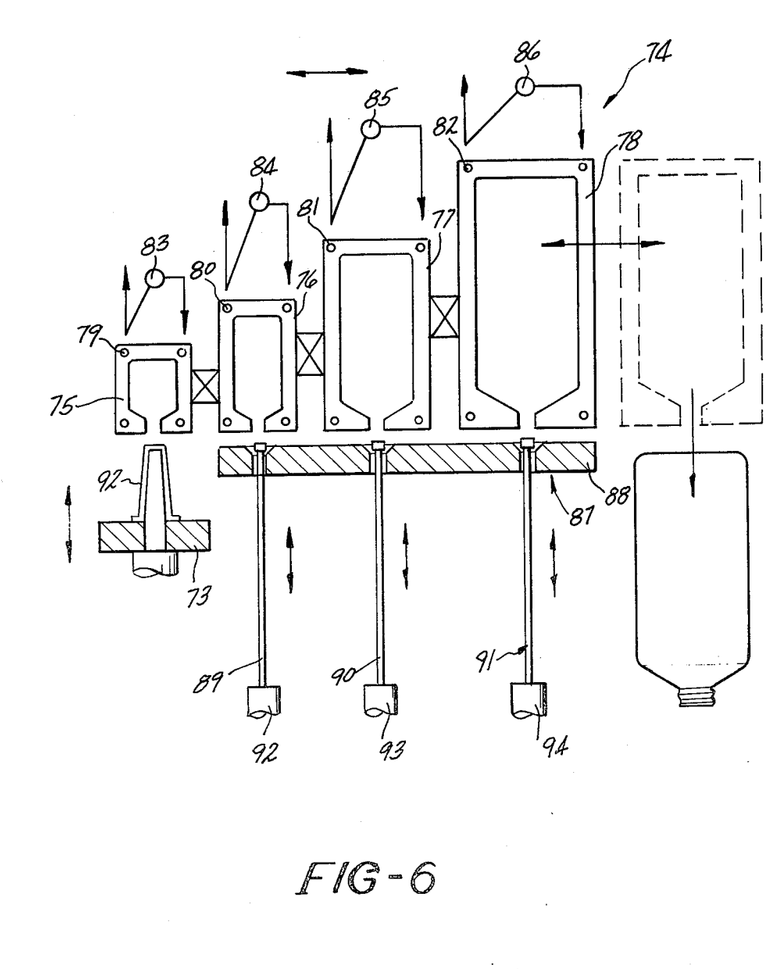
FIG. 6 is a schematic sectional view of an alternate embodiment of this invention.

FIG. 6 is a schematic representation of the apparatus of this embodiment. The structures represented herein are similar to the apparatus of FIG. 1, but such similarity should not be construed as limitative, as a wide variety of cores, molds and means to move them may be employed within the scope of this invention. Thus, blow core 73 is in all respects representative of blow core 15, and may possess all of the features of the latter. Mold assembly 74 resembles assembly 21 in the movement and general appearance, but possesses certain notable differences. The individual molds labeled 75–78, respectively, resemble molds 22 and 23 but are provided with electric heaters and/or fluid passages respectively labeled 79–82, which are connected, in a manner not shown, to electric current and/or fluid circulating means. Individual electrical resistance or fluid temperature control means 83–86 are schematically shown to indicate that the temperature within molds 75–78 is individually controllable. Assembly 74 is adapted for lateral reciprocation in the same manner as assembly 21 in FIG. 1.

Core assembly 87 is generally equivalent to a plurality of cores such as core 30 of FIG. 1. In this embodiment, the cores are situated in common platen 88, and are likewise axially reciprocable. Individual cores 89–91 differ from core 15 by the provision of individual speed controls, not shown, in conjunction with actuating means 92–94, thereby permitting independent variation of the speed of axial extension employed with a particular core.

Figure 7A:
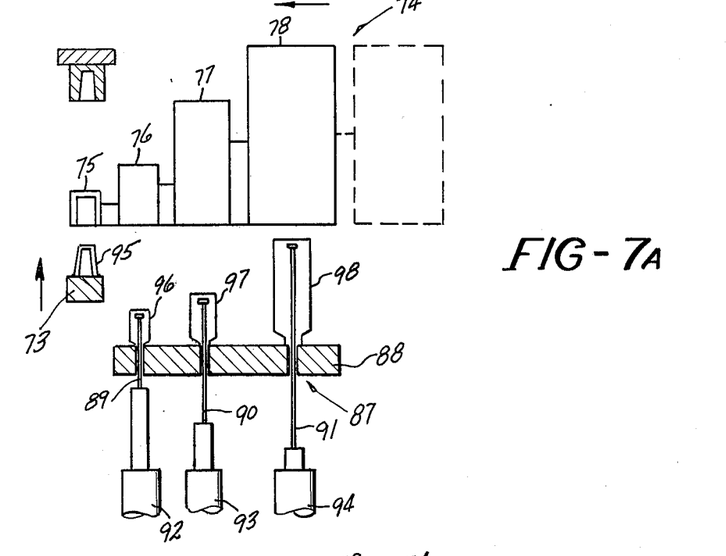
FIGS. 7A, 7B and 7C illustrate a sequence of steps associated with the embodiment of FIG. 6.
Figure 7B:
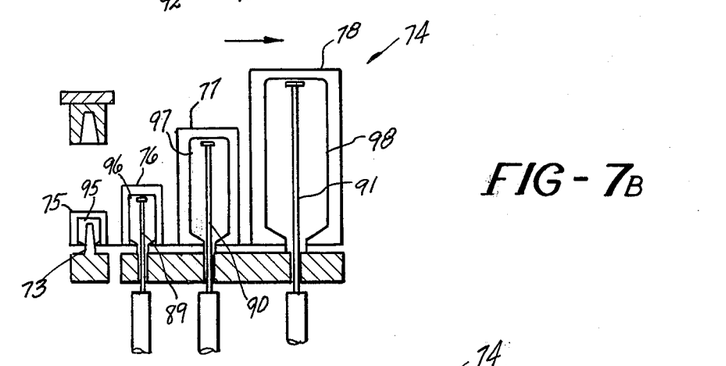
Figure 7C:
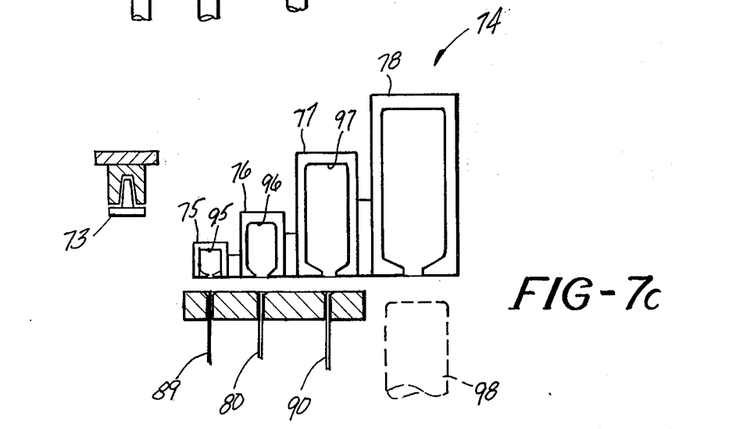

The operation of the method in accordance with this embodiment is similar to that depcited in FIGS. 2A and 2B, and is illustrated in FIGS. 7A-7C. Thus, in FIG. 7A, core 73 bearing parison 95 enters mold 75, while, at the same time, cores 89–91 bearing parisons 96–98, enter respective molds 76–78, and extension and/or expansion therein is conducted, as depicted in FIG. 7B, at a predetermined rate determined by the pre-selected speed of mandrels 89–91, and at a pre-determined temperature obtained by controlling the temperature of molds 76–78 accordingly. Upon completion of expansion, the cores are separated from the parisons and separated from the respective molds, as shown in FIG. 7C, and mold assembly 74 is laterally transferred to permit the removal of fully formed object 98, and the transfer of parisons 95–97 from molds 75–77 to cores 89–91 respectively. Assembly 74 is then shifted into the position shown in FIG. 7A to receive another parison from core 73.

The method and apparatus disclosed above are susceptible to the changes and modifications disclosed with respect to the embodiment of FIG. 1, and all of such changes are encompassed herein.

The above method enables the adaptation of the conditions of deformation to the particular material being processed while retaining the operating economy of a conventional blow-molding process. The above method makes it possible to carry out the steps of axial and/or radial orientation at the temperatures that are suitable to produce the best properties in a given plastic. Thus, a cooling or heating dwell may be introduced before axially extending the parison. Alternatively, the parison or predetermined regions thereof may be heated to alter the degree of orientation in such regions. Most importantly, though the parisons are conditioned and their deformation determined individually for the several steps that the processing for any given plastic may demand, the overall operating cycle is not lengthened, as the various operations are conducted simultaneously due to the synchronous operations of the blow cores and the mold assembly.

The finished object of the present invention is likewise characterized by many advantages. In particular, the wide walls thereof are controllably oriented in the axial, radial and tangential directions without longitudinal discontinuities or thinning. Furthermore, the article of the present invention has substantially uniform wall thickness. The uniform wall thickness in an article so oriented is highly advantageous.

Naturally, the present invention is quite versatile and a wide variety of articles of varying configurations may be readily prepared. If desired, the present invention may be performed on a continuous basis or intermittently. For example, as noted above, the process may be interrupted at any convenient stage, the product stored or shipped to another location and the process subsequently completed, such as shipping the molded parison from one location to another.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

I claim:

1. An apparatus for forming objects of moldable organic plastic material which comprises: at least one first core; means cooperating with said first core and aligned therewith for providing a parison thereon; a first mold spaced from said first core and engageable with said first core for forming said parison; means operatively connected to and carried by said first core for forming said parison located on said first core; means associated with said first core and said first mold for bringing together and for separating said first core and said first mold, said separating leaving said formed parison retained in said first mold free from said first core; at least one second core in spaced relationship to said first core; means including said first mold for transferring said formed parison from said first mold to said second core; at least one second mold in spaced relationship to said first mold; means associated with said second core and second mold for transferring said formed parison into said second mold; means on said second core for expanding the formed parison in said second mold.

2. An apparatus according to claim 1 including means on said second core for axially extending said formed parison.

3. The apparatus of claim 2 wherein said second core comprises an extensible mandrel adapted to extend said parison axially.

4. The apparatus of claim 2 wherein said means for extending said formed parison is a means for fully extending said partially formed parison.

5. The apparatus of claim 4 wherein said means for fully extending said partially formed parison is a means for fully extending said partially formed parison in said second mold.

6. The apparatus of claim 1 wherein said parison providing means comprises a heating die adapted to heat a parison placed thereinto to deformation temperature.

7. The apparatus of claim 4 wherein said heating die contains a controllable heating means.

8. The apparatus of claim 4 wherein said heating die is engageable with said first core and in lateral relation to a dispenser containing a quantity of previously formed parisons, and said first core is laterally reciprocable therebetween.

9. The apparatus of claim 1 wherein said parison providing means comprises a dispenser containing a quantity of previously formed parisons which is engageable with at least one of said first cores.

10. The apparatus of claim 9 wherein said dispenser is engageable with at least two of said cores, and said parison providing means further comprises a parison die engageable with said cores and in lateral relation to said dispenser and said cores are reciprocable therebetween.

11. The apparatus of claim 1 wherein said first core includes controllable heating means.

12. The apparatus of claim 1 wherein said parison providing means comprises a dispenser containing a quantity of pre-formed parisons or parison liners in lateral relation to said first core, a parison die or heating die in juxtaposition to said core, and means for conveying said parison or liner from said dispenser to said core.

13. The apparatus of claim 12 wherein said conveying means comprises a carrier assembly juxtaposed with said dispenser and laterally reciprocable into alignment between said core and said die.

14. The apparatus of claim 13 wherein said carrier assembly comprises a receptacle which is separable into at least two sections and means for separating and uniting said sections.

15. The apparatus of claim 14 wherein said separating and uniting means act in response to the movement of said blow core.

16. The apparatus of claim 1 wherein said means for forming said parison on said first core comprises fluid under pressure carried through a tubular passageway and directed against the inner surface of the parison.

17. The apparatus of claim 16 wherein said passageway is contained within said core.

18. The apparatus of claim 1 wherein said means for expanding said partially formed parison in said second mold comprises fluid pressure carried through a tubular passageway and directed into the space existing between the parison and the core.

19. The apparatus of claim 18 which comprises a plurality of interconnected second molds and a corresponding number of second cores.

20. The apparatus of claim 19 wherein said interconnected second molds are mounted on an indexing device and are adapted to move into and out of cooperation with said cores.

21. The apparatus of claim 20 wherein said indexing device comprises a rotary carousel.

22. The apparatus of claim 20 wherein said interconnected molds are serially connected to said first mold.

23. The apparatus of claim 22 wherein the cavity within each of said second molds is progressively increased in size.

24. The apparatus of claim 23 wherein each of said molds including said first mold possesses a temperature control means.

25. The apparatus of claim 19 where at least one of said second cores includes an extensible mandrel for axially extending said parison in said second molds.

26. The apparatus of claim 25 including a speed control for regulating the rate of movement of said mandrels.

27. The apparatus of claim 1 further including a transfer device comprising at least one removal means adapted to retain said expanded objects upon release from said second mold.

28. The apparatus of claim 27 comprising a plurality of removal fingers carried on indexing means for movement in and out of communication with said second mold.

29. The apparatus of claim 1 wherein said parison providing means comprises a parison die defining the outer parison surface, with said first core defining the inner parison surface and means for introducing moldable plastic therein.

30. The apparatus of claim 29 wherein said introducing means comprises a pressure molding apparatus.

31. The apparatus of claim 1 wherein said first core is a blow core.

32. The apparatus of claim 1 wherein said second core is a blow core.

33. The apparatus of claim 1 wherein said means for expanding the formed parison in said second mold is a means for fully expanding the partially formed parison.

34. The apparatus of claim 1 including means operatively connected to said first mold for moving said first mold into and out of alignment with said first and second cores.

35. The apparatus of claim 34 including means operatively connected to said second mold for moving said second mold into and out of alignment with said second core.

36. The apparatus of claim 35 wherein said first mold and said second mold are maintained in integral spaced relationship and arranged for common reciprocation.

37. The apparatus of claim 1 including means operatively connected to said first core for moving said first core into and out of engagement with said first mold.

38. The apparatus of claim 37 including means operatively connected to said second core for moving said second core into and out of engagement with said first mold and second mold.

39. The apparatus of claim 1 including a neck mold associated with said first core.

40. The apparatus of claim 1 including a neck mold associated with said second core.

41. The apparatus of claim 1 including means operatively connected to said second core for separating said second core and said second mold and and expanded parison contained therein while retaining the expanded parison in said second mold.

* * * * *

UNITED STATES PATENT AND TRADEMARK OFFICE
CERTIFICATE OF CORRECTION

PATENT NO. : 3,966,378
DATED : June 29, 1976
INVENTOR(S) : Emery I. Valyi

It is certified that error appears in the above-identified patent and that said Letters Patent are hereby corrected as shown below:

In Column 11, line 27, claim 7 should read on claim 6 and not claim 4.

In column 11, line 29, claim 8 should read on claim 6 and not claim 4.

Signed and Sealed this

Tenth Day of May 1977

[SEAL]

Attest:

RUTH C. MASON
Attesting Officer

C. MARSHALL DANN
Commissioner of Patents and Trademarks